US007418670B2

(12) United States Patent
Goldsmith

(10) Patent No.: US 7,418,670 B2
(45) Date of Patent: Aug. 26, 2008

(54) HIERARCHICAL IN-PLACE MENUS

(75) Inventor: Kevin Goldsmith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 10/678,806

(22) Filed: Oct. 3, 2003

(65) Prior Publication Data
US 2005/0076309 A1 Apr. 7, 2005

(51) Int. Cl.
*G06F 3/048* (2006.01)
(52) U.S. Cl. .................. 715/810; 715/811; 715/829; 715/841; 715/825; 715/854
(58) Field of Classification Search ............. 715/811, 715/810, 829, 825, 841, 854, 817, 818, 819, 715/820, 828, 845
See application file for complete search history.

(56) References Cited

U.S. PATENT DOCUMENTS

| 5,485,175 | A | * | 1/1996 | Suzuki | 715/841 |
| 5,559,945 | A | | 9/1996 | Beaudet et al. | |
| 5,621,905 | A | | 4/1997 | Jewson et al. | |
| 5,689,668 | A | | 11/1997 | Beaudet et al. | |
| 6,128,012 | A | | 10/2000 | Seidensticker, Jr. et al. | |
| 6,236,400 | B1 | * | 5/2001 | Guerrero | 715/841 |
| 6,686,938 | B1 | * | 2/2004 | Jobs et al. | 715/835 |
| 2003/0132911 | A1 | * | 7/2003 | Narioka et al. | 345/156 |

OTHER PUBLICATIONS

Cohen, Frank. Visual Interface Guidelines. ST-Log, Feb. 1989, Issue 28, p. 2, [online], [retrieved on Sep. 30, 2006]. Retrieved from the internet <URL: http://www.atarimagazines.com/st-log/issue28/20_1_VISUAL_INTERFACE_GUIDELINES.php>.*
Including. (n.d.). Dictionary.com Unabridged (v 1.1), The American Heritage® Dictionary of the English Language, Fourth Edition. Retrieved May 8, 2007, from Dictionary.com website: http://dictionary.reference.com/browse/including.*

* cited by examiner

*Primary Examiner*—Weilun Lo
*Assistant Examiner*—Rashedul Hassan

(57) ABSTRACT

A hierarchical menu system displays submenus in place of parent menus, and vice versa, when appropriate menu items are selected from within parent menus and submenus. Parent menu items selected from within parent menus are displayed within submenus as links back to previous parent menus. Benefits of the disclosed hierarchical menu system include the ability to implement a hierarchical menu on devices having varying screen sizes, including small-screen devices, while maintaining a history of previously selected menu items that enable a user to navigate within the hierarchical menu to any previously displayed menu.

31 Claims, 8 Drawing Sheets

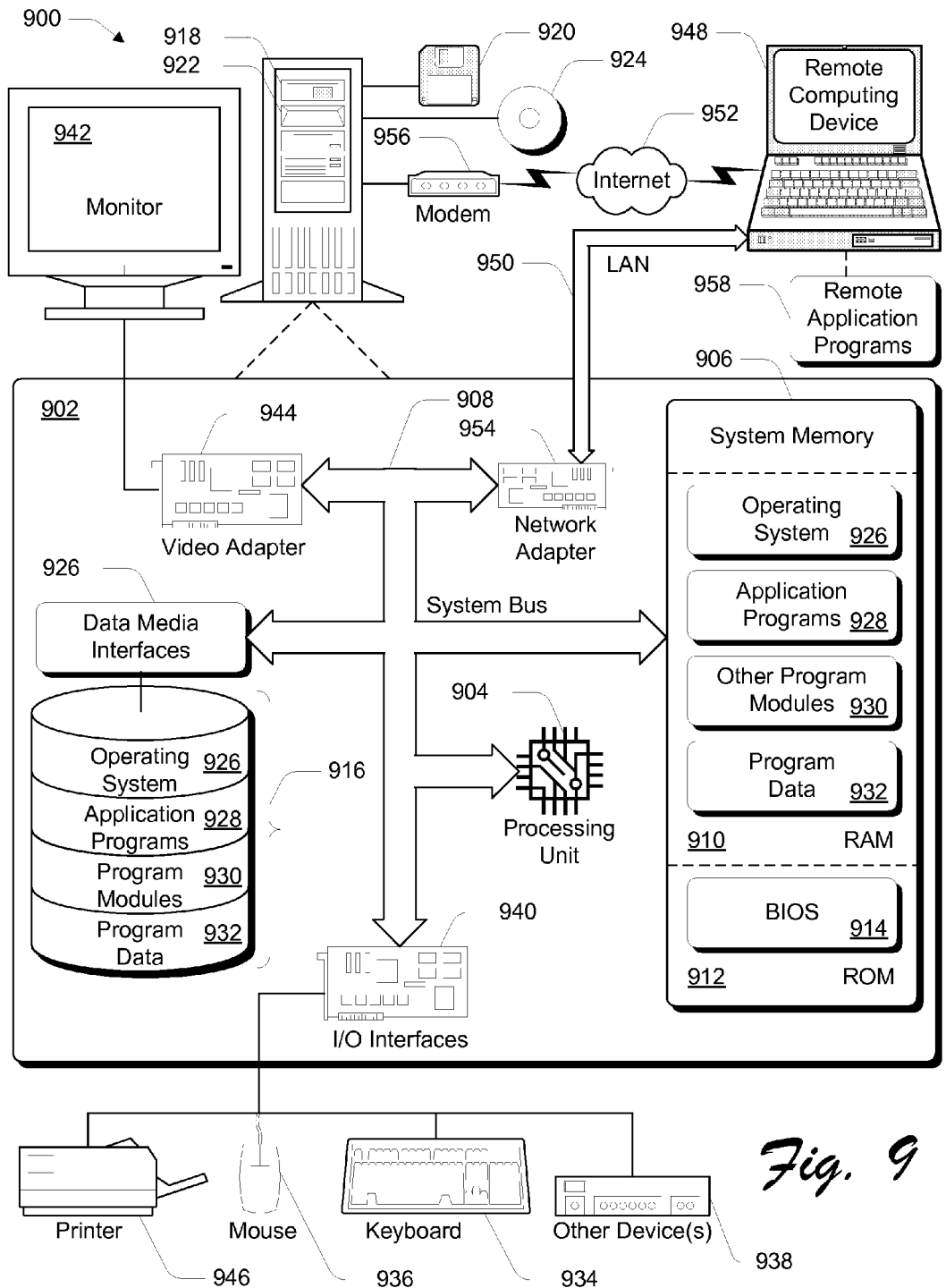

HIERARCHICAL IN-PLACE MENUS

TECHNICAL FIELD

The present disclosure generally relates to menus, and more particularly, to a hierarchical in-place menu that replaces parent menus with submenus.

BACKGROUND

Most conventional application programs are menu-driven as opposed to being command-driven. Menu-driven applications provide a list of possible commands or options from which a user may choose, while command-driven applications require users to enter explicit commands. Thus, menu-driven applications are generally easier for the average user to learn than are command-driven applications. Menus are typically implemented as a list of textual or graphical choices (i.e., menu items) from which a user can choose. Thus, menus allow a user to select a menu item, for example, by pointing to the item with a mouse and then clicking on the item. Examples of other methods of selecting menu items include highlighting an item and then hitting the 'return' key or 'enter' key, and pressing on a menu item through a touch-sensitive screen.

One particularly useful type of menu is a hierarchical menu. An example of a conventional hierarchical menu 100 is shown in FIG. 1. As shown in FIG. 1, hierarchical menus 100 typically present a parent menu 102 that has selectable menu items. The selection of each menu item normally causes another menu, or submenu 104 to be displayed next to the currently displayed menu. A submenu 104 has additional menu choices that are related to the selected parent menu item which results in the display of the submenu. The depth of a hierarchical menu can extend in this manner to many levels of submenus.

The example menu shown in FIG. 1 illustrates how conventional hierarchical menus 100 generally lay out from left to right across a display screen as menu choices are selected. This menu format provides various advantages such as retaining previous and current menus on the display screen at the same time. This provides a historical menu map as menu selections are made and their corresponding submenus are displayed across the screen. Users can therefore review previous menu selections that have been made while progressing to the most recently displayed menu, making it easier to move between different menu items and different menu levels.

Although such hierarchical menus provide useful advantages, there are scenarios in which their use is impracticable. One such scenario is when hierarchical menus are used on devices having small display screens. The problems presented when attempting to implement conventional hierarchical menus on small-screen devices have generally discouraged the use of hierarchical menus with such devices. FIG. 2 illustrates an example of how the hierarchical menu 100 of FIG. 1 might appear on the display screen of a small-screen device.

As indicated above, hierarchical menus generally lay out across the display screen from left to right. On small-screen devices where the room on the screen is not wide enough to accommodate all of the menus, the menus lay out across the screen in both directions, from left to right and back again. In this scenario, the menus typically begin to overlap one another, creating various problems. One problem is that the overlapping menus can be confusing to the user, as FIG. 2 is intended to illustrate. Overlapping menus can make it difficult for a user to discern previous menu selections which can, in turn, make it difficult to determine how to return to previous menus to make different menu selections. Thus, one of the intended benefits of a hierarchical menu can be undermined when the hierarchical menu is implemented on a small-screen device.

Overlapping menus can also create problems with small-screen devices (and other devices) that employ pen-based or stylus-based touch-sensitive screens. With such devices, it is often difficult to maintain contact continuity between menus on the screen when the menus are overlapping. In other words, it is easy to move off of menus with small-screen, touch-based devices. If continuity is lost when moving from one menu to another, menus will often disappear from the screen, causing the user to have to go back and reactivate the menu from a prior menu. This problem becomes worse when using pen-based devices that "track". "Tracking" is where a cursor on the screen follows (tracks) the movement of the pen as the pen moves over the screen even though the pen is not touching the screen. Tracking is lost if the pen is pulled too far away from the screen. Thus, pen-based devices that "track" tend to lose more menus when hierarchical menus are employed.

Accordingly, as the demand for small-screen devices capable of running increasingly complex applications continues to grow, the need exists for a way to implement hierarchical menus that overcomes various disadvantages with conventional hierarchical menus.

SUMMARY

An "in-place" hierarchical menu displays parent menus and submenus alternately. Selecting a parent menu option from within a parent menu, replaces the parent menu with a submenu. The submenu includes submenu options in addition to the previously selected parent menu option. The parent menu option can be selected from within the submenu to return to the parent.

In accordance with one implementation, the parent menu includes a forward pointer associated with the parent menu option indicating that a selection of the parent menu option from the parent menu will replace the parent menu with a submenu.

In accordance with another implementation, the submenu includes a backward pointer associated with the parent menu option indicating that a selection of the parent menu option from the submenu will replace the submenu with the parent menu.

BRIEF DESCRIPTION OF THE DRAWINGS

The same reference numerals are used throughout the drawings to reference like components and features.

FIG. 9 illustrates an exemplary computing environment suitable for implementing an exemplary computer as shown in FIG. 3.

DETAILED DESCRIPTION

Overview

The following discussion is directed to a hierarchical menu system that displays submenus in place of parent menus, and vice versa, when appropriate menu items are selected from within parent menus and submenus. Thus, parent menus and submenus are displayed individually and alternately, providing an "in-place" hierarchical menu. Parent menu items selected from within parent menus are displayed within submenus above submenu items. Previously selected parent menu items are displayed within submenus with a backward pointer indicating that a selection of the parent menu item from within the submenu will replace the currently displayed submenu with the corresponding parent menu. Parent menu items within parent menus may be displayed with a forward pointer indicating that a selection of the parent menu item from within the parent menu will replace the parent menu with a corresponding submenu.

Benefits of the disclosed hierarchical menu system include the ability to implement a hierarchical menu on devices having varying screen sizes, including small-screen devices. The disclosed hierarchical in-place menu permits the display of one hierarchical menu at a time, while still maintaining a history of previously selected menu items that enable a user to navigate within the hierarchical menu to any previously displayed menu. The disclosed hierarchical menu system permits application developers to design application menus in a typical hierarchical fashion while requiring at most, a simple operating system call to have their hierarchical menu implemented as a hierarchical in-place menu.

Exemplary Environment

Figure 3:
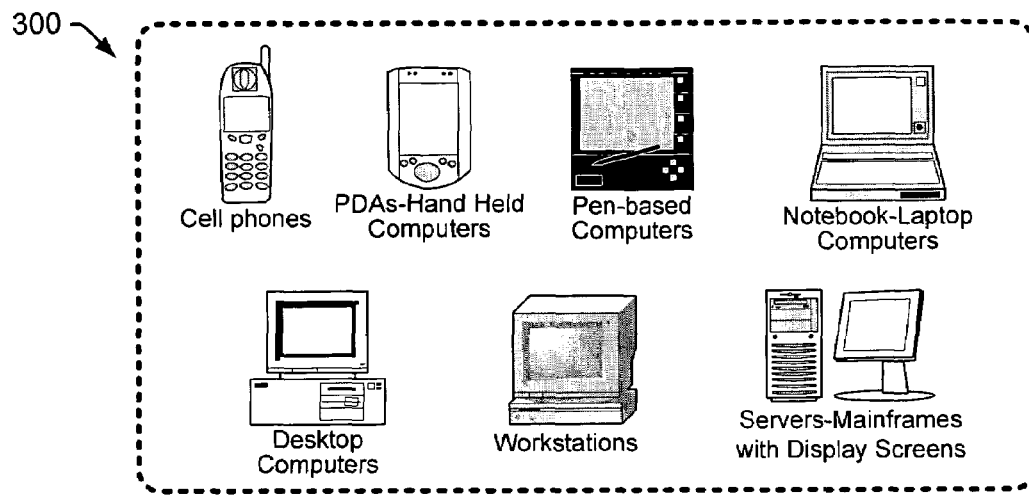
FIG. 3 illustrates various examples of computing devices that are suitable environments in which to implement hierarchical in-place menus.

FIG. 3 shows various examples of computing devices 300 that are suitable environments in which to implement hierarchical in-place menus. A computer 300 is typically capable of performing common computing functions, such as email, calendaring, task organization, word processing, Web browsing, and so on. Computer 300 may run an open platform operating system, such as the Windows® brand operating systems from Microsoft®. Computer 300 may be implemented as any one of various computing devices that has a display screen and supports a GUI (graphical user interface). Such computing devices can include, for example, cell phones, PDAs, pen-based and/or touch-based computers with touch-sensitive screens, notebooks, laptops, desktops, workstations, server and mainframe computers that include displays, and the like. One exemplary implementation of computer 300 is described in more detail below with reference to FIG. 9.

In the embodiments described below, computer 300 is generally discussed as being implemented as a small-screen, hand-held device such as, for example, a cell phone or a PDA (personal digital assistant; e.g., devices running Microsoft®'s PocketPC, Hewlett-Packard's Palmtop, 3Com's PalmPilot, etc.). Such devices generally provide more limited computing capabilities than a typical personal computer, such as information storage and retrieval capabilities for personal or business use, including keeping schedule calendars and address book information. Such devices usually offer some version of an operating system such as Windows CE, while various applications are generally available that provide limited functionality compared to full-fledged versions available for typical personal computers. Thus, a computer 300 implemented as a small-screen, hand-held mobile computer may include limited versions of email, phone, SMS (short message service), organizer and Web applications.

Exemplary Embodiments

Figure 4:
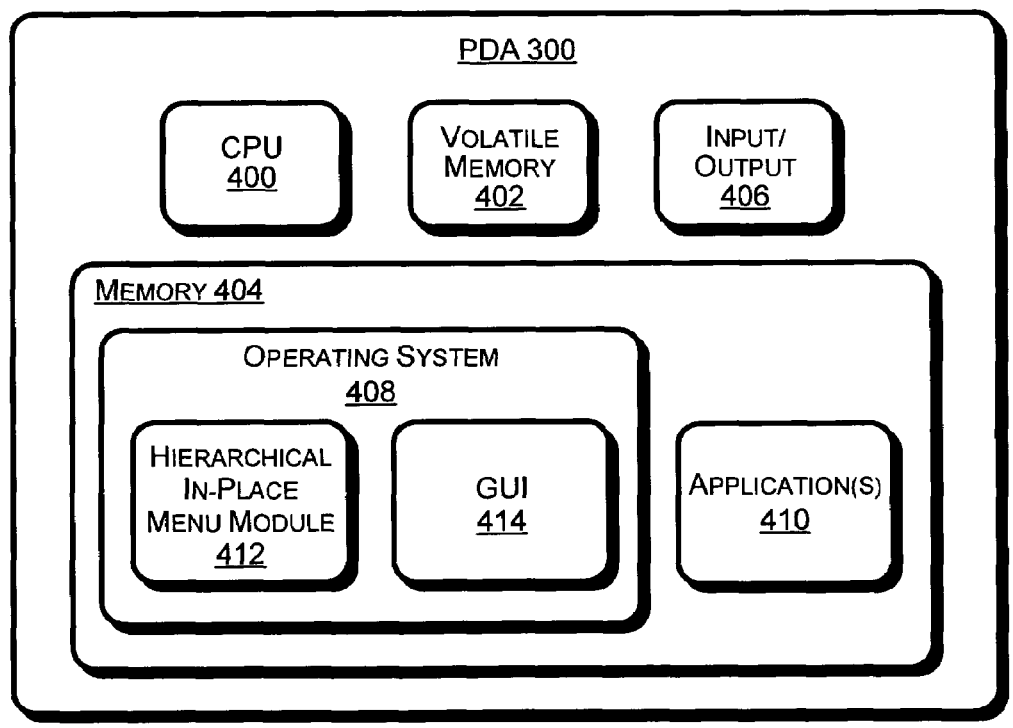
FIG. 4 illustrates an exemplary embodiment of a computer in the form of a PDA that is suitable for implementing a hierarchical in-place menu.

FIG. 4 illustrates an exemplary embodiment of a computer 300 suitable for implementing a hierarchical in-place menu. Computer 300 is implemented generally as a small-screen device such as a PDA 300 (personal digital assistant) in the exemplary embodiment of FIG. 4.

PDA 300 includes a processor 400, a volatile memory 402 (i.e., RAM), and a nonvolatile memory 404 (e.g., ROM, hard disk, floppy disk, CD-ROM, etc.). Nonvolatile memory 404 generally provides storage of computer/processor-readable instructions, data structures, program modules and other data for PDA 300. PDA 300 may also include various input/output 406 devices. Input device 406 examples (not shown) can include a mouse or track ball for moving a cursor and making selections, a touch-sensitive display screen, a stylus pen for making menu input selections on a touch-sensitive display screen displaying menu options and/or soft buttons of a GUI (graphical user interface), hard buttons on the PDA 300 structure, and so on. Output device 406 examples (not shown) can include a display screen, a touch-sensitive display screen, an audio speaker, and so on. One exemplary implementation of a PDA 300 is described in more detail below with reference to FIG. 9.

PDA 300 implements an operating system (OS) 408 on processor 400 from volatile memory 402. The OS 408 is stored in memory 404 and initially loaded from memory 404 into volatile memory 402 by a boot program (not shown). The OS 408 is generally configured to manage other application programs 410 that are also stored in memory 404 and executable on processor 400 from volatile memory 402. The OS 408 honors requests for services made by application programs 410 through predefined application program interfaces (APIs). More specifically, the OS 408 typically determines the order in which multiple applications 410 execute on processor 400 and the execution time allotted for each application 410, manages the sharing of memory 402 among multiple applications 410, handles input and output to and from attached hardware devices (e.g., hard disks, printers, dial-up ports), and so on. In addition, users can typically interact directly with the OS 408 through a user interface such as a command language or graphical user interface.

PDA 300 typically implements various application programs 410 stored in memory 404 and executable on processor 400. Such applications 410 might include software programs implementing, for example, word processors, spread sheets, browsers, file share programs, database management systems (DBMS), peer-to-peer applications, multimedia players, computer-aided design tools and the like. Most applications 410 are menu-driven programs that provide a list of possible commands or options from which a user may choose in order to implement various application functions on the PDA 300.

The manner in which menu selections are made often depends upon the particular type of computer device 300 running an application 410. For example, entering a menu selection on a desktop computer 300 that has a mouse as an input device 406 may occur by pointing to a menu item with a mouse and then clicking on the item. Many small-screen computing devices 300, such as PDA 300 of FIG. 4, implement GUIs (graphical user interfaces) on touch-sensitive screens through which menu selections can be made by pressing a pen or stylus to desired menu choices. Other methods of selecting menu items include, for example, highlighting menu items and then hitting the 'return' key or 'enter' key.

The menuing task is generally performed by a menuing subsystem of an operating system executing on a computer 300. Accordingly, as illustrated in PDA 300 of the FIG. 4 embodiment, a 'hierarchical in-place menu module' 412 is implemented as part of operating system 408. In general, the menu module 412 is configured to receive menu calls from various applications 410 and to service those calls by displaying a menu on a display screen according to the parameters provided by the application 410 making the menu call. The menu module 412 also manages menu selections made under a GUI 414 supported by operating system 408. Although modules 412 and 414 are illustrated as being part of operating system 408, it is noted that such modules might also function as stand-alone modules stored in memory 404 and executable on processor 400. In general, although the functioning of modules 412 and 414 as part of operating system 408 is preferred, it is not intended as a limitation regarding their implementation by a computer 300.

In addition to managing typical menuing functions, the 'hierarchical in-place menu module' 412 implements a hierarchical 'in-place' menu in accordance with application programs 410 that support hierarchical menus. Thus, for applications 410 designed to provide hierarchical menus, menu module 412 is configured to implement those hierarchical menus as hierarchical 'in-place' menus. The implementation of a hierarchical menu as a hierarchical in-place menu can occur automatically for any application making a hierarchical menu call to operating system 408, or it can occur based on a specific request from an application 410 to implement the hierarchical menu as a hierarchical in-place menu. Thus, small-screen computer device manufacturers can configure devices to automatically provide hierarchical in-place menus for application developers. This enables application developers to design hierarchical menus in a typical manner without making any changes to their application source code. Alternatively, small-screen computer device manufacturers can configure devices to provide hierarchical in-place menus by default, or upon request for application developers. This enables application developers to design hierarchical menus in a typical manner and further allows them to determine if application menus will be implemented as hierarchical in-place menus by making a simple selection through their application source code.

Figure 1:
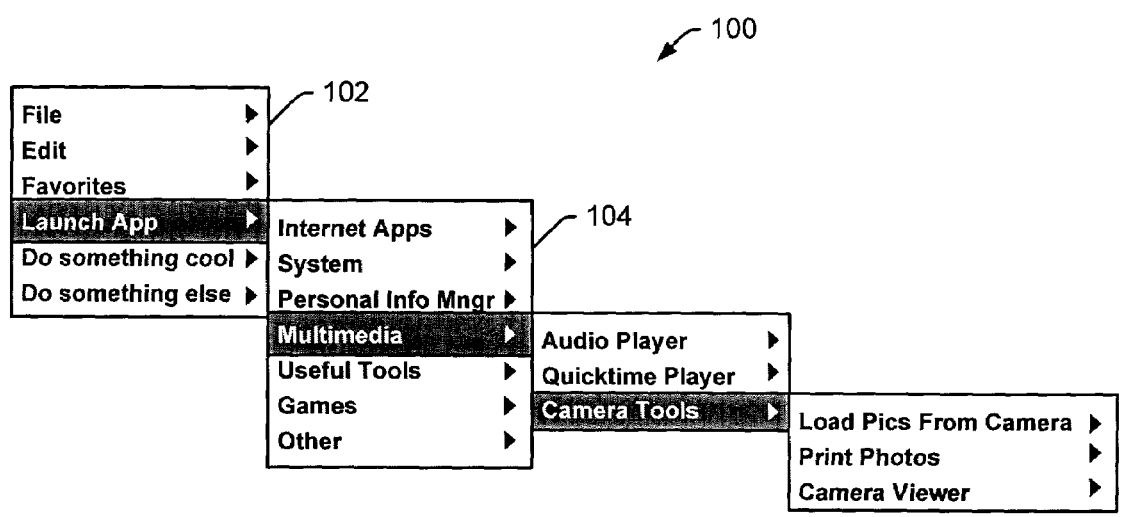
FIG. 1 illustrates a conventional hierarchical menu.
Figure 2:
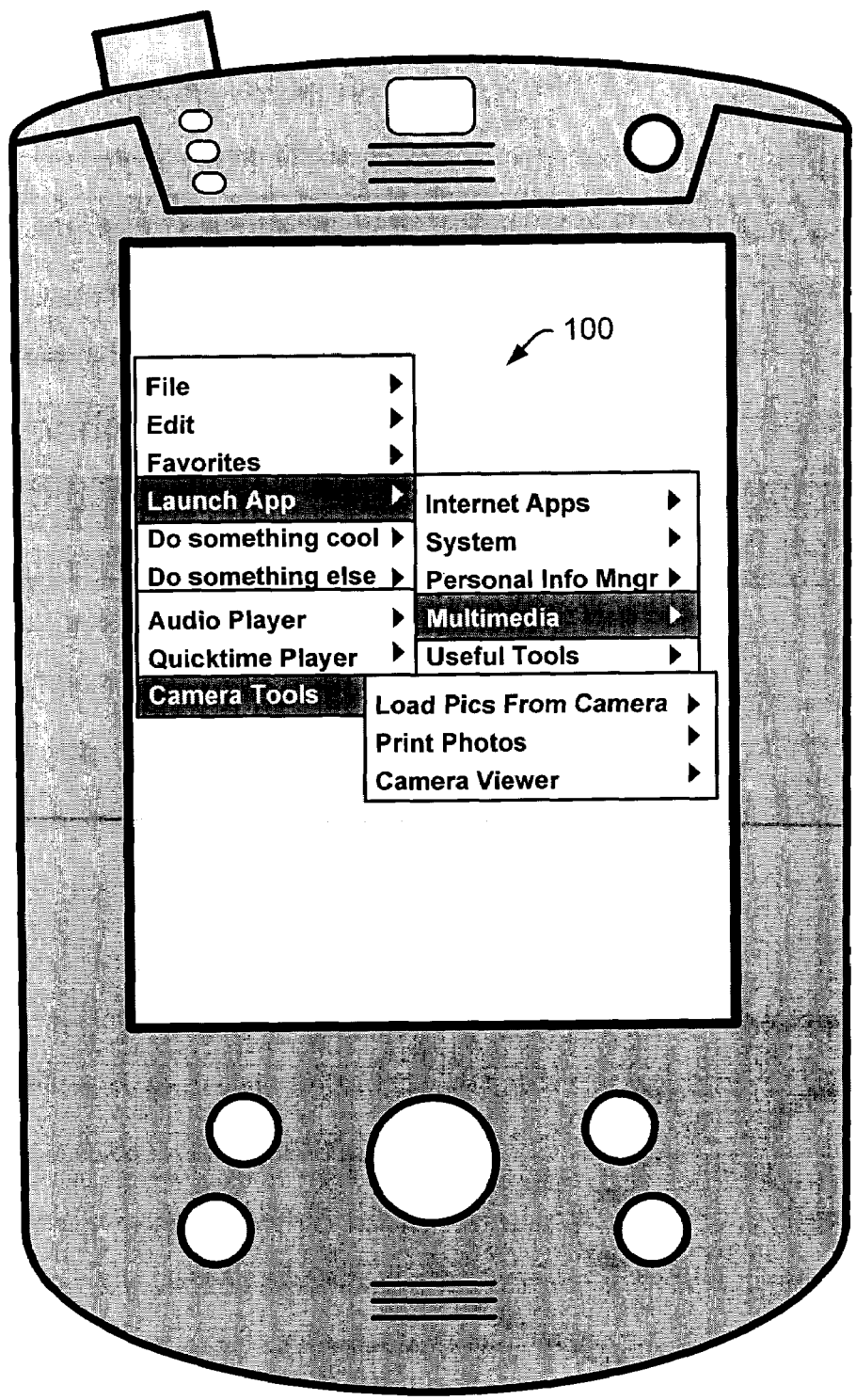
FIG. 2 illustrates an attempt at implementing the conventional hierarchical menu of FIG. 1 on a small-screen computing device.
Figure 5:
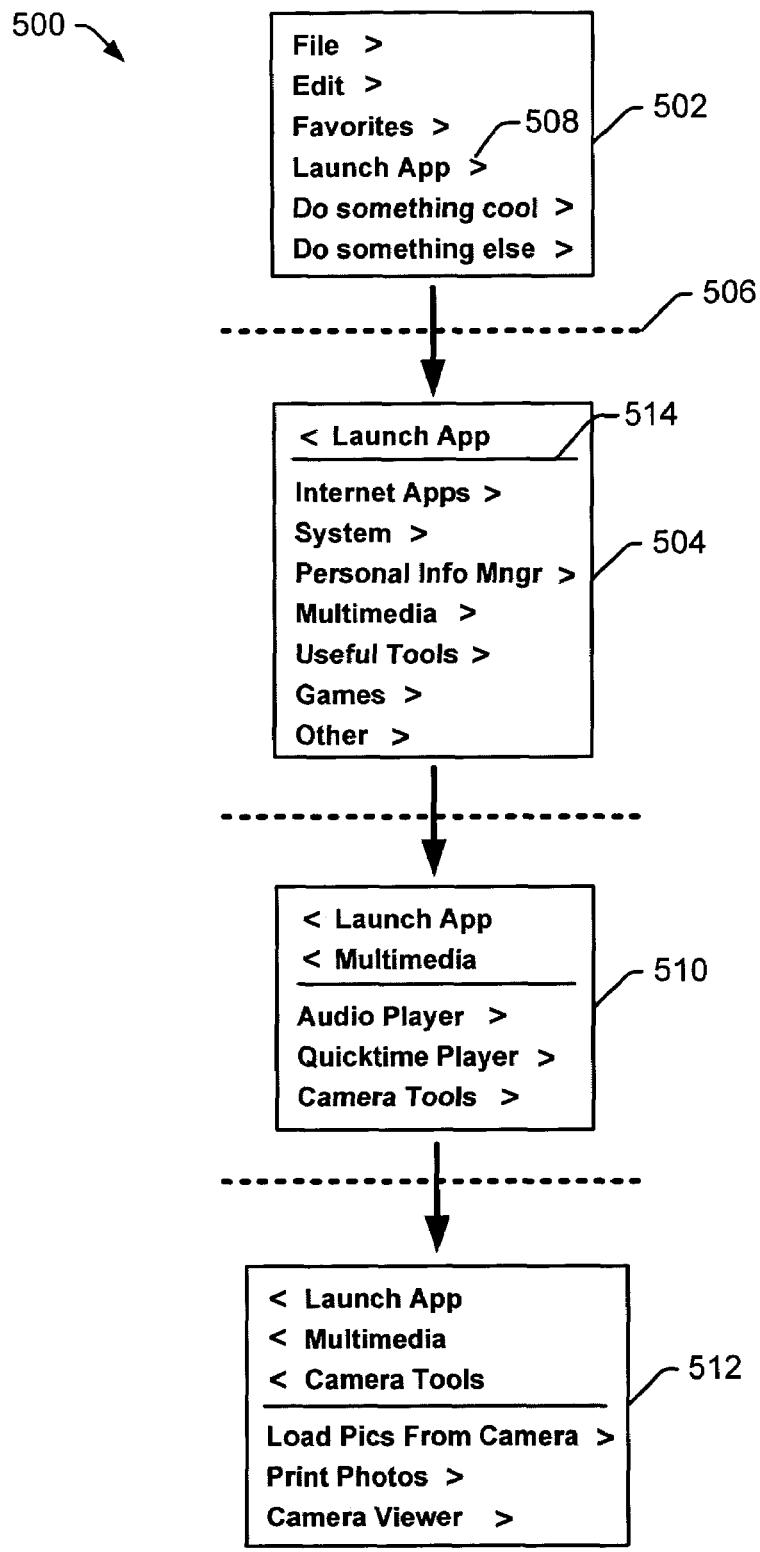
FIG. 5 illustrates an exemplary hierarchical in-place menu as might be implemented on a computer such as the PDA of FIG. 4.

FIG. 5 illustrates an exemplary hierarchical in-place menu 500 that might be implemented on a computer 300 such as PDA 300 of FIG. 4. As shown in FIG. 5, a hierarchical in-place menu 500 includes a top level or parent menu 502 that has selectable menu items. In addition, a selection of each parent menu item normally causes another menu, or submenu 504 to be displayed. Like a typical hierarchical menu, the depth of a hierarchical in-place menu 500 can extend in this manner to many levels of submenus such as second, third, fourth and fifth levels, with submenus being parent menus to other submenus. However, by contrast to a typical hierarchical menu (e.g., menu 100 of FIG. 1), the hierarchical in-place menu 500 does not display an additional menu (e.g., submenu 504) next to a currently displayed menu (e.g., parent menu 502). Instead, the hierarchical in-place menu 500 replaces the currently displayed menu (e.g., parent menu 502) with a new menu (e.g., submenu 504). It displays a new menu "in-place" of a currently displayed menu.

The dashed lines 506 of FIG. 5 are intended to indicate that each of the menus of the hierarchical in-place menu 500 are displayed separately from one another. Menus in a hierarchical in-place menu 500 are not displayed at the same time on the same computer display screen. Instead, menus in a hierarchical in-place menu 500 replace one another on a computer display screen as menu items are selected. Accordingly, menu items in a parent menu (e.g., 502) can have associated forward pointers (e.g., arrows) that indicate that the selection of the menu item will result in the display of a submenu containing additional menu choices related to the menu item. For example, parent menu item "Launch App" shown in parent menu 502 includes a forward pointer 508 that indicates a submenu will replace parent menu 502 upon selection of "Launch App" from within parent menu 502. It is instructive to note, that depending on which menu is currently being displayed, a menu can be both a parent menu and a submenu. This notion is generally applicable throughout this discussion.

Submenu 504 is an example of a submenu that might replace parent menu 502 upon selection of "Launch App" from within parent menu 502. Submenu 504 additionally illustrates how a hierarchical in-place menu 500 retains previously selected parent menu items (e.g., "Launch App") and displays them within currently displayed menus (e.g., submenu 504) that result from the previously selected menu items. Previously selected parent menu items (e.g., "Launch App" in submenu 504, "Launch App" and "Multimedia" in submenu 510, "Launch App", "Multimedia" and "Camera Tools" in submenu 512) are displayed within submenus (e.g., 504, 510, 512) above currently displayed submenu items. Typically, there is a divider 514 such as a line dividing the previously selected parent items from the currently displayed submenu items. Furthermore, previously selected parent items displayed within submenus have associated backward pointers 516 indicating a parent menu will replace the currently displayed submenu upon selection of a previously selected parent item from within the submenu. For example, a selection of "Launch App" within submenu 504 will result in the replacement of submenu 504 with previously displayed parent menu 502. Note that "Launch App" within submenu 504 has an associated backward pointer (e.g., arrow) indicating that this selection will return the display back to the corresponding parent menu 502.

Figure 6:
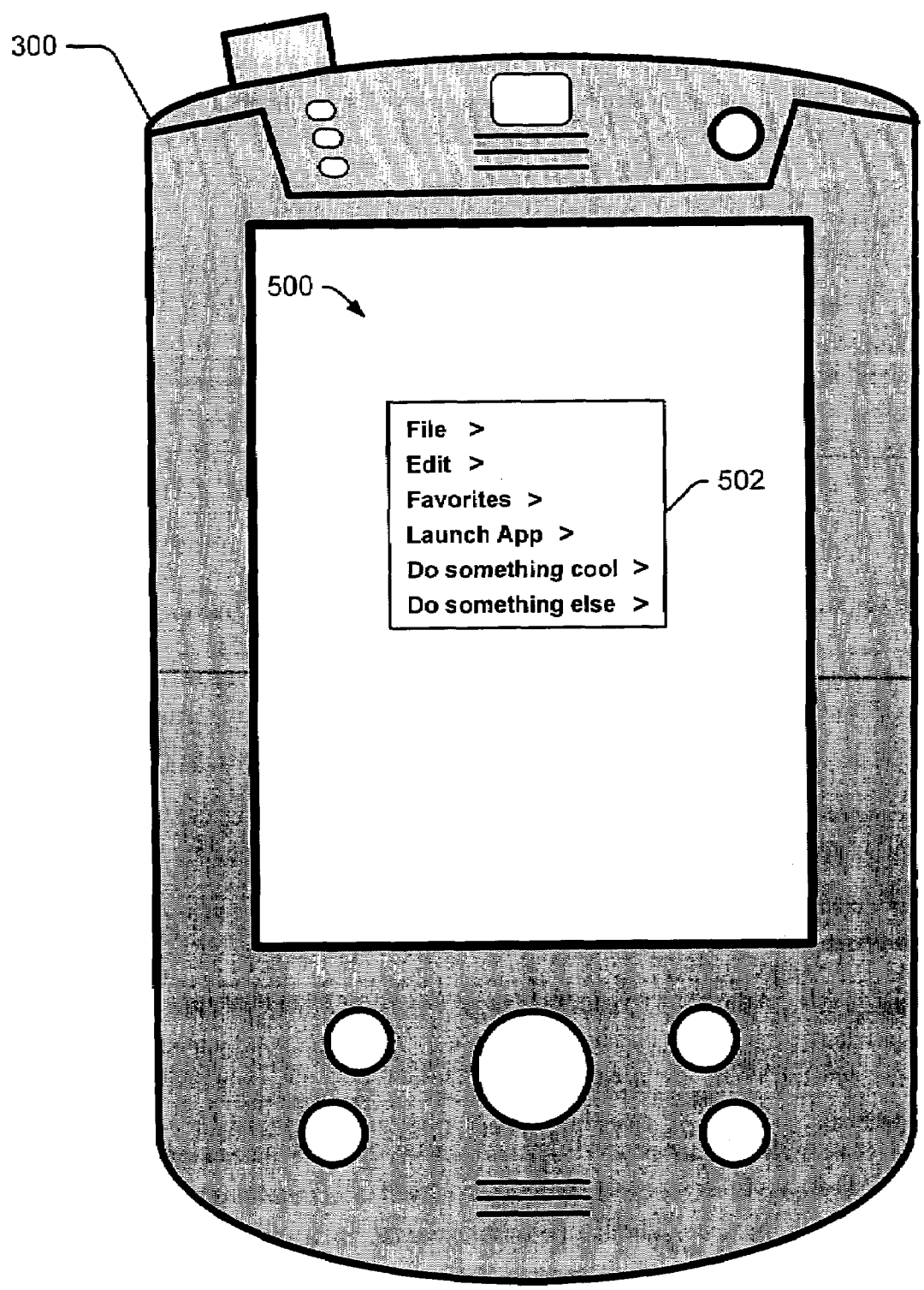
FIGS. 6 and 7 illustrate example implementations of a hierarchical in-place menu on a small-screen computer device such as the PDA of FIG. 4.
Figure 7:
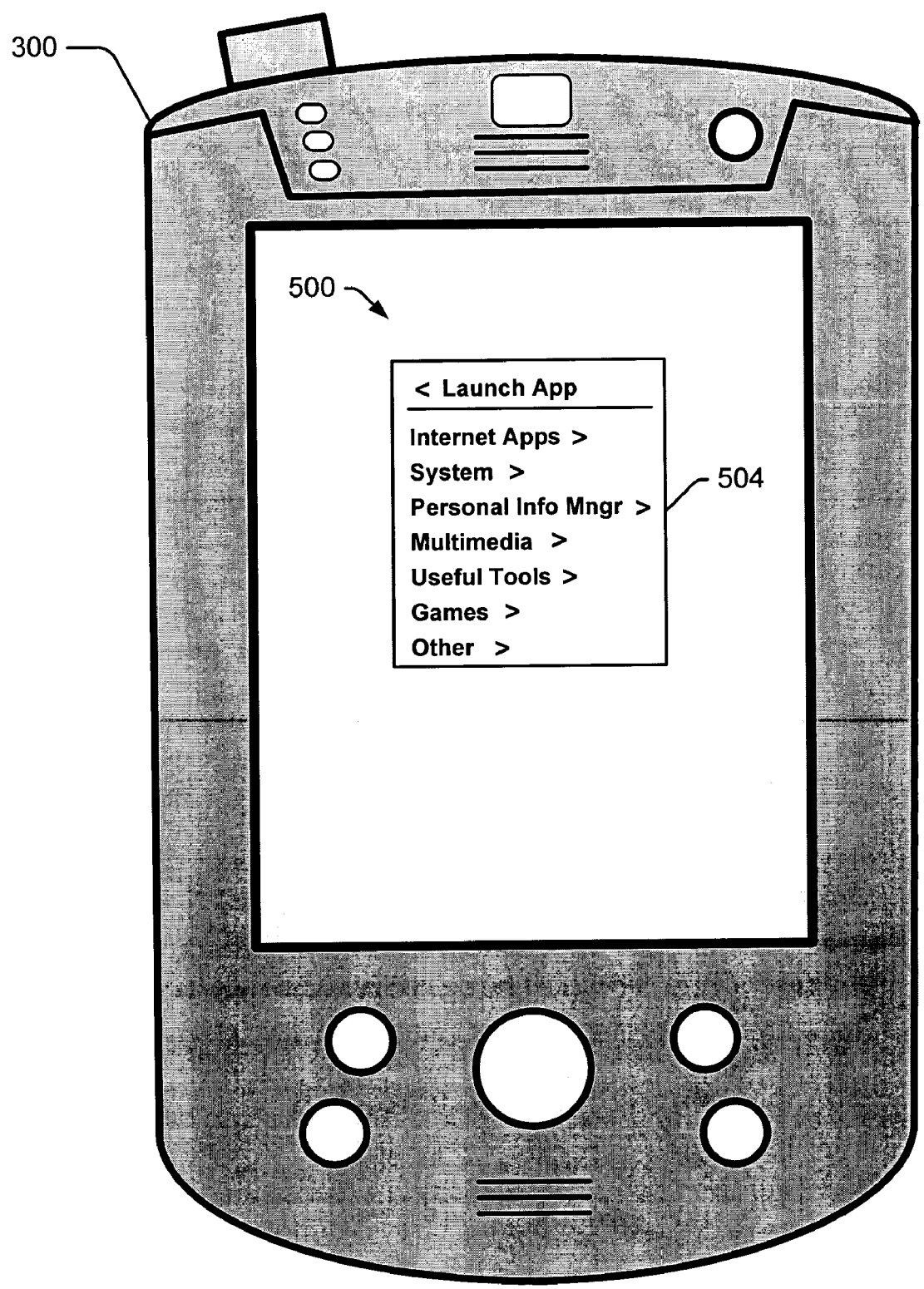

FIGS. 6 and 7 illustrate examples of how a hierarchical in-place menu 500 can be implemented on a small-screen computer device (or any size screen device). The display of a single menu box in a hierarchical "in-place" manner relieves the small screen from having to display the various different levels of a menu hierarchy across the screen, as is the case with conventional hierarchical menus (e.g., hierarchical menu 100 of FIG. 1). However, the hierarchical in-place menu 500 still provides a historical menu map through the display of previously selected menu items from parent menus, and thereby enables users to "jump back" to any place in the menu hierarchy.

FIG. 6 shows the parent menu 502 from FIG. 4 displayed as a singular menu box on the screen of a PDA 300. FIG. 7 shows the result of selecting the "Launch App" menu item from the parent menu 502. The result of this menu selection is the replacement of the parent menu 502 on the screen of the PDA 300 with a submenu 504 that includes submenu items related to the "Launch App" selection made from the parent menu 502. The submenu 504 of FIG. 7 illustrates how a hierarchical in-place menu 500 permits the implementation of hierarchical menus on small-screen devices while preserving a historical map of menu selections that allows a user to easily jump back to previous menus.

Exemplary Methods

Example methods for implementing a hierarchical in-place menu will now be described with primary reference to the flow diagram of FIG. 8. The methods apply generally to the exemplary embodiments discussed above with respect to FIGS. 1-7. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 8:
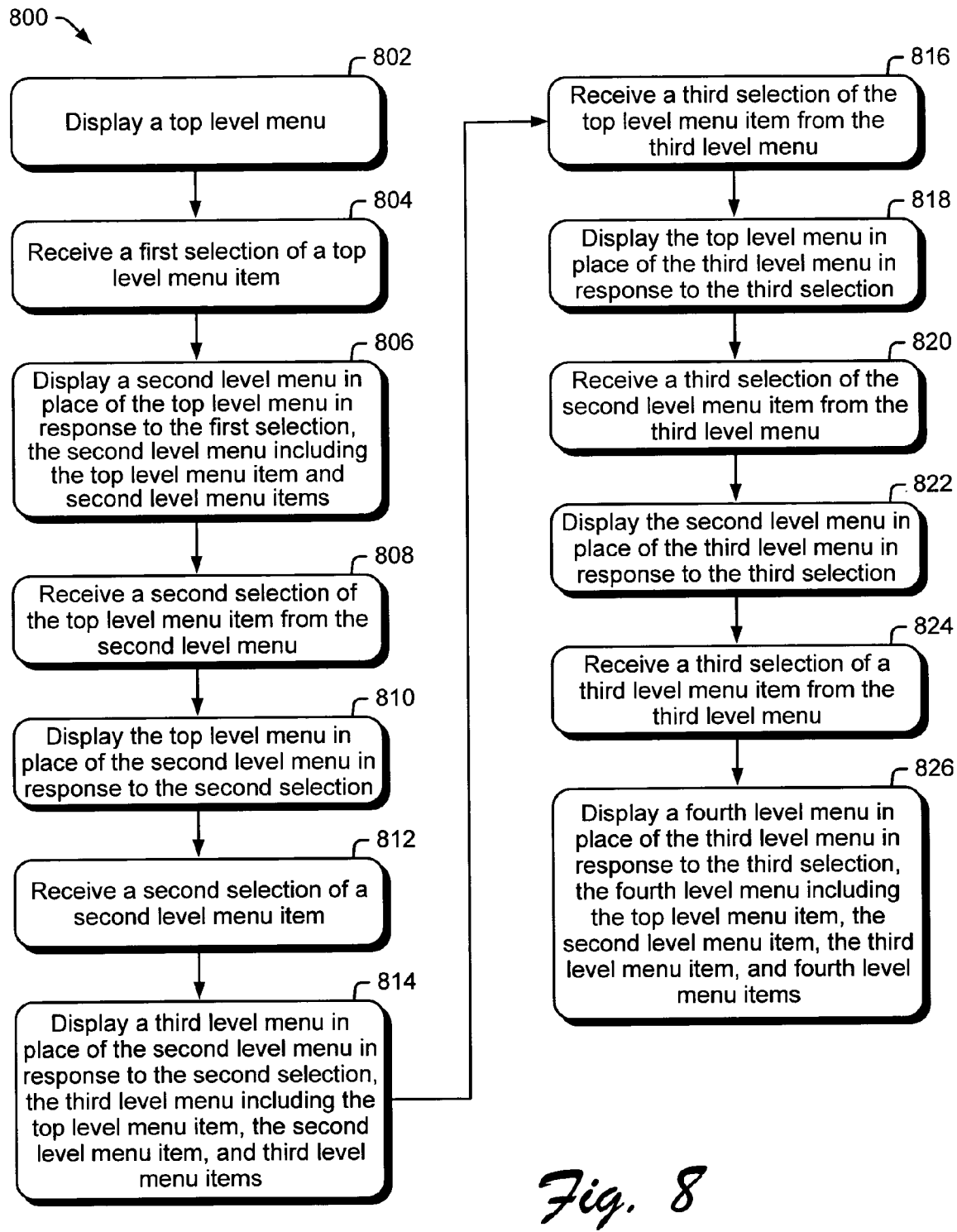
FIG. 8 illustrates an exemplary method for implementing a hierarchical in-place menu on a computer device such as a PDA or other similar device having a small display screen.

FIG. 8 shows an exemplary method 800 for implementing a hierarchical in-place menu on a computer device 300 such as a PDA or other similar device having a small display screen. The method 800 describes a hierarchical menu process that could continue well beyond the number of submenus that are discussed in the method itself. Thus, the extent of method 800 is not intended as a limitation. Rather, the extent of method 800 is intended to generally express the manner by which a hierarchical in-place menu can be implemented in lesser and greater degrees of size and complexity.

At block 802 of method 800, a top level menu is displayed on a display screen of a computer, such as a small-screen PDA 300. The top level menu is also a parent menu to one or more submenus which may both be configured as modal menus. The top level menu is typically initiated by a user input such as the click of a mouse or the pressing of a pen or stylus to a touch-sensitive display screen. At block 804, a first menu selection is received from the top (or parent) level menu. The selection is a top level menu item displayed in the top level menu.

At block 806, a second level menu (or submenu) is displayed in place of the top level menu in response to the first menu selection. The top level menu is no longer displayed on the display screen. However, the second level menu includes the top level menu item that was selected in order to initiate the second level menu. Therefore, the second level menu retains a link to the previous menu in the hierarchy of menus. The second level menu also includes second level menu items. One or more of the second level menu items are links to additional levels of submenus that contain further menu choices related to the items in the second level menu that link to the additional menu levels.

At block 808, a second selection of the top level menu item is received from the second level menu. This second selection of the top level menu item from within the second level menu is tantamount to a user wanting to jump back in the menu hierarchy to the top level menu. Thus, at block 810, the top level menu is displayed in place of the second level menu in response to the second selection.

At block 812, a second selection of a second level menu item is received from the second level menu. This second selection of the second level menu item from within the second level menu is tantamount to a user wanting to jump forward in the menu hierarchy to an additional submenu providing more choices related to the second level menu item. Accordingly, at block 814, a third level menu is displayed in place of the second level menu in response to this second selection. The third level menu includes the top level menu item, the second level menu item, and third level menu items. The top level menu item and second level menu item provide links back to previous menus in the hierarchy of menus, while one or more of the third level menu items provide a link forward to an additional related submenu.

At block 816, a third selection of the top level menu item is received from within the third level menu. This third selection of the top level menu item from within the third level menu is tantamount to a user wanting to jump back in the menu hierarchy to the top level menu. Therefore, at block 818, the top level menu is displayed in place of the third level menu in response to this third selection.

At block 820, a third selection of the second level menu item is received from within the third level menu. This third selection of the second level menu item from within the third level menu is tantamount to a user wanting to jump back in the menu hierarchy to the second level menu. Therefore, at block 822, the second level menu is displayed in place of the third level menu in response to this third selection.

At block 824, a third selection of a third level menu item is received from within the third level menu. This third selection of a third level menu item from within the third level menu is tantamount to a user wanting to jump forward in the menu hierarchy to a new submenu that provides additional menu choices. Therefore, at block 826, a fourth level menu is displayed in place of the third level menu in response to this third selection. The fourth level menu includes the top level menu item, the second level menu item, the third level menu item, and fourth level menu items.

While one or more methods have been disclosed by means of flow diagrams and text associated with the blocks of the flow diagrams, it is to be understood that the blocks do not necessarily have to be performed in the order in which they were presented, and that an alternative order(s) may result in similar advantages. Furthermore, the methods are not exclusive and can be performed alone or in combination with one another.

Exemplary Computer

FIG. 9 illustrates an exemplary computing environment suitable for implementing a computer 300 such as discussed above with reference to FIGS. 1-8. Although one specific configuration is shown in FIG. 9, computer 300 may be implemented in other computing configurations.

The computing environment 900 includes a general-purpose computing system in the form of a computer 902. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. An example of a system bus 908 would be a Peripheral Component Interconnects (PCI) bus, also known as a Mezzanine bus.

Computer 902 typically includes a variety of computer-readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 9 illustrates a bard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by a SCSI interface (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a caching scheme for user network access information.

Computer 902 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system comprising one or more processor readable storage media having instructions to provide:

one or more applications; and an operating system comprising at least one module configured to receive one or more menu calls from the one or more applications that specify a plurality of menu items, at least one of the menu items being selectable to implement a function of the one or more applications and to service those calls by:
  displaying a top level menu;
  receiving a first selection of a top level menu item; and
  in response to the first selection, displaying a second level menu in place of the top level menu, the second level menu including the top level menu item and second level menu items;
wherein the at least one module of the operating system is configured to receive the one or more calls specifying concurrent display of the top level menu and the second level menu and automatically introduce the top level menu item into the second level menu and display the second level menu in place of the top level menu.

2. A system as recited in claim 1, wherein the at least one module is further configured for:
  receiving a second selection of the top level menu item from the second level menu; and
  in response to the second selection, displaying the top level menu in place of the second level menu.

3. A system as recited in claim 1, wherein the at least one module is further configured for:
  receiving a second selection of a second level menu item; and
  in response to the second selection, displaying a third level menu in place of the second level menu, the third level menu including the top level menu item, the second level menu item, and third level menu items.

4. A system as recited in claim 3, wherein the at least one module is further configured for:
  receiving a third selection of the top level menu item from the third level menu; and
  in response to the third selection, displaying the top level menu in place of the third level menu.

5. A system as recited in claim 3, wherein the at least one module is further configured for:
  receiving a third selection of the second level menu item from the third level menu; and
  in response to the third selection, displaying the second level menu in place of the third level menu.

6. A system as recited in claim 3, wherein the at least one module is further configured for:
  receiving a third selection of a third level menu item from the third level menu; and
  in response to the third selection, displaying a fourth level menu in place of the third level menu, the fourth level menu including the top level menu item, the second level menu item, the third level menu item, and fourth level menu items.

7. A system as recited in claim 1, wherein the top level menu item is oriented within the second level menu above the second level menu items.

8. A system as recited in claim 1, wherein the top level menu item is associated within the second level menu with a backward pointer indicating that a selection of the top level menu item from the second level menu will replace the second level menu with the top level menu.

9. A system as recited in claim 8, wherein a second level menu item is associated within the second level menu with a forward pointer indicating that a selection of the second level menu item will replace the second level menu with a third level menu.

10. A system as recited in claim 1, wherein the top level menu and the second level menu are both modal menus.

11. A system as recited in claim 3, wherein the top level menu item and the second level menu item are each associated within the third level menu with a backward pointer indicating that a selection of the top level menu item or the second level menu item from the third level menu will replace the third level menu with the top level menu or the second level menu, respectively.

12. A system as recited in claim 11, wherein a third level menu item is associated within the third level menu with a forward pointer indicating that a selection of the third level menu item will replace the third level menu with a fourth level menu.

13. A system as recited in claim 6, wherein the top level menu item, the second level menu item, and the third level menu item are each associated within the fourth level menu with a backward pointer indicating that a selection of the top level menu item, the second level menu item, or the third level menu item from the fourth level menu will replace the fourth level menu with the top level menu, the second level menu, or the third level menu, respectively.

14. A computer including the system of claim 1.

15. A computer comprising:
  a processor; and
  an operating system executable via the processor comprising at least one module configured to service one or more calls received via one or more application programming interfaces from one or more applications that specify a plurality of menu items, at least one of the menu items being selectable to implement a function of the one or more applications by:
    displaying a parent menu;
    displaying a submenu in place of the parent menu in response to a selection of a parent said menu item within the parent menu; and
    maintaining a stack of previously selected parent said menu items in the submenu, each of the previously selected parent said menu items configured to display a corresponding parent menu in place of the submenu,
  wherein the at least one module of the operating system is configured to receive the one or more calls specifying concurrent display of the parent menu and the submenu and automatically introduce parent said menu items into the submenu and display the submenu in place of the parent menu.

16. A computer as recited in claim 15, wherein the at least one module is further configured for displaying the parent menu in response to a selection of a previously selected parent said menu item from the submenu.

17. A processor-readable storage medium comprising processor-executable instructions that are configured to provide an operating system comprising at least one module that is callable by one or more applications to specify a plurality of menu items, at least one of the menu items being selectable to implement a function of the one or more applications via one or more application programming interfaces for:
  displaying a parent menu from a hierarchical menu;
  receiving a first selection of a first said menu item from the parent menu;
  displaying a submenu from the hierarchical menu in place of the parent menu in response to the first selection; and
  displaying the menu item within the submenu as a previously selected said menu item selectable to jump back to the parent menu
  wherein the at least one module of the operating system is configured to receive a call specifying concurrent display of the parent menu and the submenu and automatically introduce the menu item into the submenu and display the submenu in place of the parent menu.

18. A processor-readable storage medium as recited in claim 17, wherein the module is further callable to display the parent menu in place of the submenu in response to receipt of a selection of the previously selected said menu item.

19. A processor-readable storage medium as recited in claim 18, wherein the module is further callable to display second submenu from the hierarchical menu in place of the submenu in response to receipt of a selection of a submenu item, wherein the second submenu includes the previously selected said menu item selectable to jump back to the parent menu and the submenu item selectable to jump back to the submenu.

20. A processor-readable storage medium comprising processor-executable instructions that are configured to provide an operating system comprising at least one module that is callable by one or more applications to specify a plurality of menu options, at least one of the menu options being selectable to implement a function of the one or more applications; specify whether to implement a hierarchical in-place menu or a hierarchical menu that is not in-place; and display a GUI (graphical user interface) configured to implement the hierarchical in-place menu comprising the plurality of menu options, the hierarchical in-place menu comprising:

a parent menu that includes parent menu options, at least one parent menu option being selectable to replace the parent menu with a submenu; and the submenu that includes the at least one parent menu option and submenu options wherein the at least one module of the operating system is configured to receive a call specifying concurrent display of the parent menu and the submenu and automatically display the hierarchical in-place menu.

21. A processor-readable storage medium as recited in claim 20, wherein the at least one parent menu option is selectable from the submenu to replace the submenu with the parent menu.

22. A processor-readable storage medium comprising processor-executable instructions that are configured to provide an operating system comprising at least one module that is callable by one or more applications to:

specify a plurality of menu items of the one or more applications, at least one of the menu items being selectable to implement a function of the one or more applications; and display a GUI (graphical user interface) configured to implement a hierarchical menu to include the plurality of menu items, the hierarchical menu comprising a current menu that includes current menu options and a previously selected menu option from a parent menu, the previously selected menu option selectable to replace the current menu with the parent menu wherein the at least one module of the operating system is configured to receive a call specifying concurrent display of the parent menu and the current menu and automatically display the current menu in place of the parent menu.

23. A processor-readable storage medium as recited in claim 22, wherein the current menu includes a plurality of previously selected menu items, each previously selected menu item corresponding to a respective parent menu and selectable to replace the current menu with the respective parent menu.

24. A computer comprising the processor-readable storage medium that is configured to provide the at least one module that is callable by the one or more application to display the GUI of claim 22.

25. A processor-readable storage medium comprising processor-executable instructions that are configured to provide an operating system comprising at least one module that is callable by one or more applications via an application programming interface to;

specify a plurality of menu items of the one or more applications, at least one of the menu items being selectable to implement a function of the one or more applications; and display a GUI (graphical user interface) configured to implement a hierarchical menu to include the plurality of menu items, the hierarchical menu comprising a parent menu and a submenu that are alternately and individually displayed in place of one another wherein the at least one module of the operating system is configured to receive a call specifying concurrent display of the parent menu and the submenu and automatically display the submenu in place of the concurrent display.

26. A processor-readable storage medium as recited in claim 25, wherein the submenu includes a parent menu option previously selected from the parent menu, the parent menu option selectable from the submenu to replace the submenu with the parent menu.

27. A processor-readable storage medium comprising processor-executable instructions that are configured to provide an operating system comprising at least one module that is callable by one or more applications via an application programming interface to:

specify a plurality of menu items of the one or more applications, at least one of the menu items being selectable to implement a function of the one or more applications; and display a hierarchical menu, to include the plurality of menu items, comprising a parent menu and a submenu each having a parent menu option, the parent menu option selectable from the parent menu to replace the parent menu with the submenu and the parent menu option selectable from the submenu to replace the submenu with the parent menu wherein the at least one module of the operating system is configured to receive a call specifying concurrent display of the parent menu and the submenu and automatically display the submenu in place of the concurrent display.

28. A processor-readable storage medium as recited in claim 27, wherein the parent menu comprises a forward pointer associated with the parent menu option to indicate that selection of the parent menu option from the parent menu will replace the parent menu with the submenu.

29. A processor-readable storage medium as recited in claim 27, wherein the submenu comprises a backward pointer associated with the parent menu option to indicate that selection of the parent menu option from the submenu will replace the submenu with the parent menu.

30. A processor-readable storage medium as recited in claim 27 configured to display a single menu at a time, the single menu selected from the group comprising:

the parent menu; and the submenu.

31. A computer comprising:

memory; and an operating system stored in the memory comprising a hierarchical in-place menu module that is configured to implement a hierarchical in-place menu in response to one or more calls received via one or more application programming interfaces from an application program that specify a plurality of menu items, at least one of the menu items being selectable to implement a function of the application, the hierarchical in-place menu including a parent menu and a submenu each displayable separately from one another and each having a parent menu option, the parent menu option selectable from the parent menu to replace the parent menu with the submenu and the parent menu option selectable from the submenu to replace the submenu with the parent menu, wherein the hierarchical in-place menu module displays the hierarchical in-place menu automatically in response to the one or more calls specifying concurrent display of the parent menu and the submenu.

* * * * *